Dec. 18, 1934.  H. R. BRAND  1,984,782
HEATING APPARATUS FOR GRIDDLES
Filed Aug. 3, 1929  2 Sheets-Sheet 1
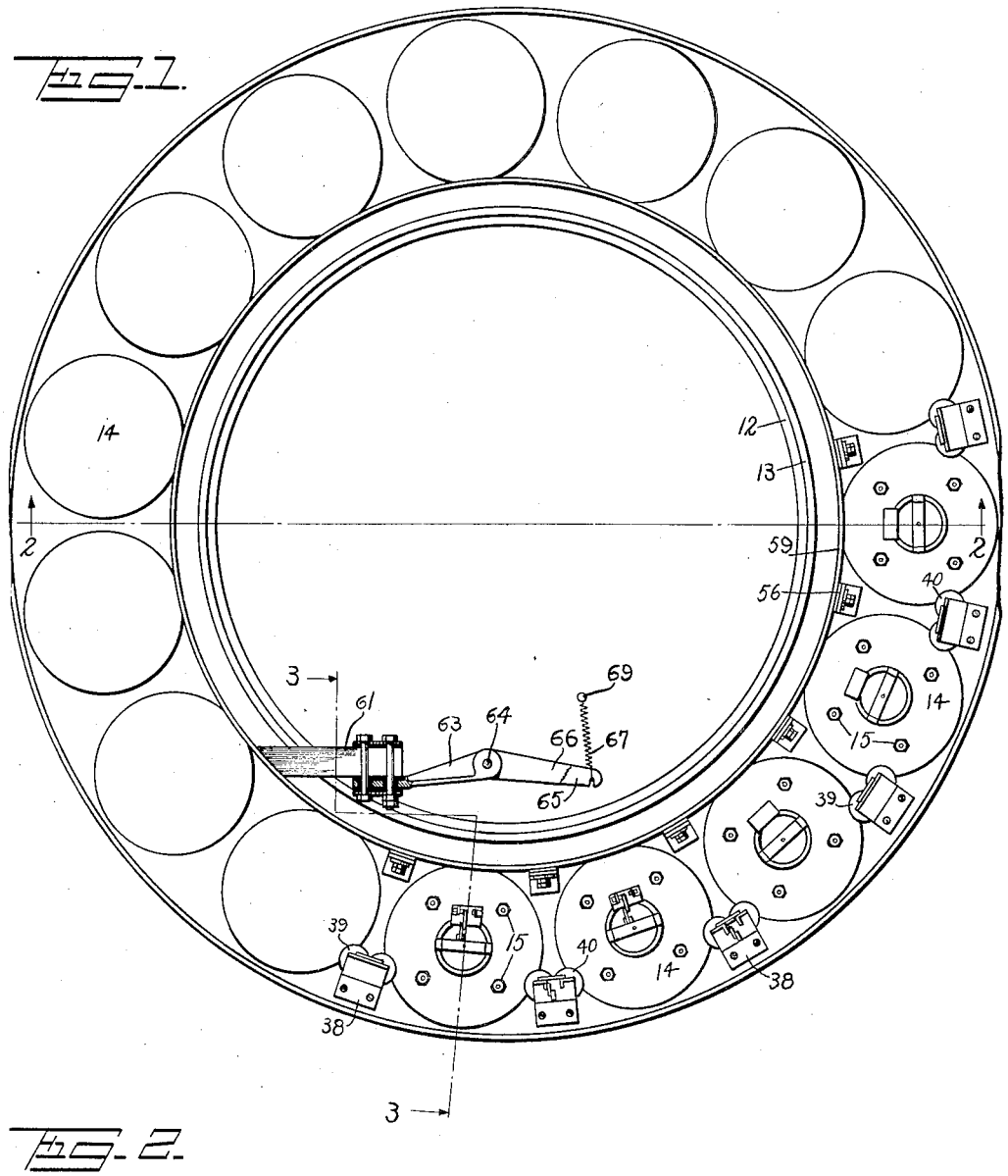
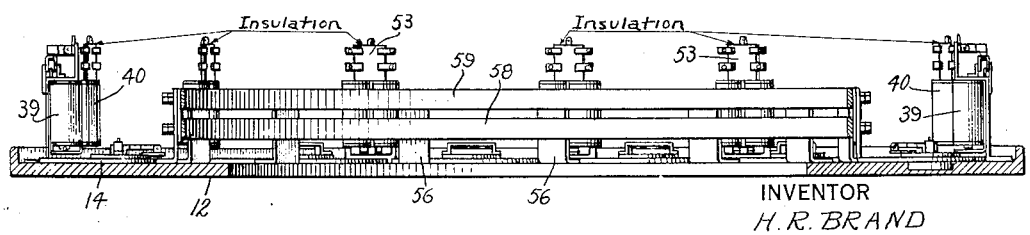
INVENTOR
H. R. BRAND
BY
Russell Bond
ATTORNEY

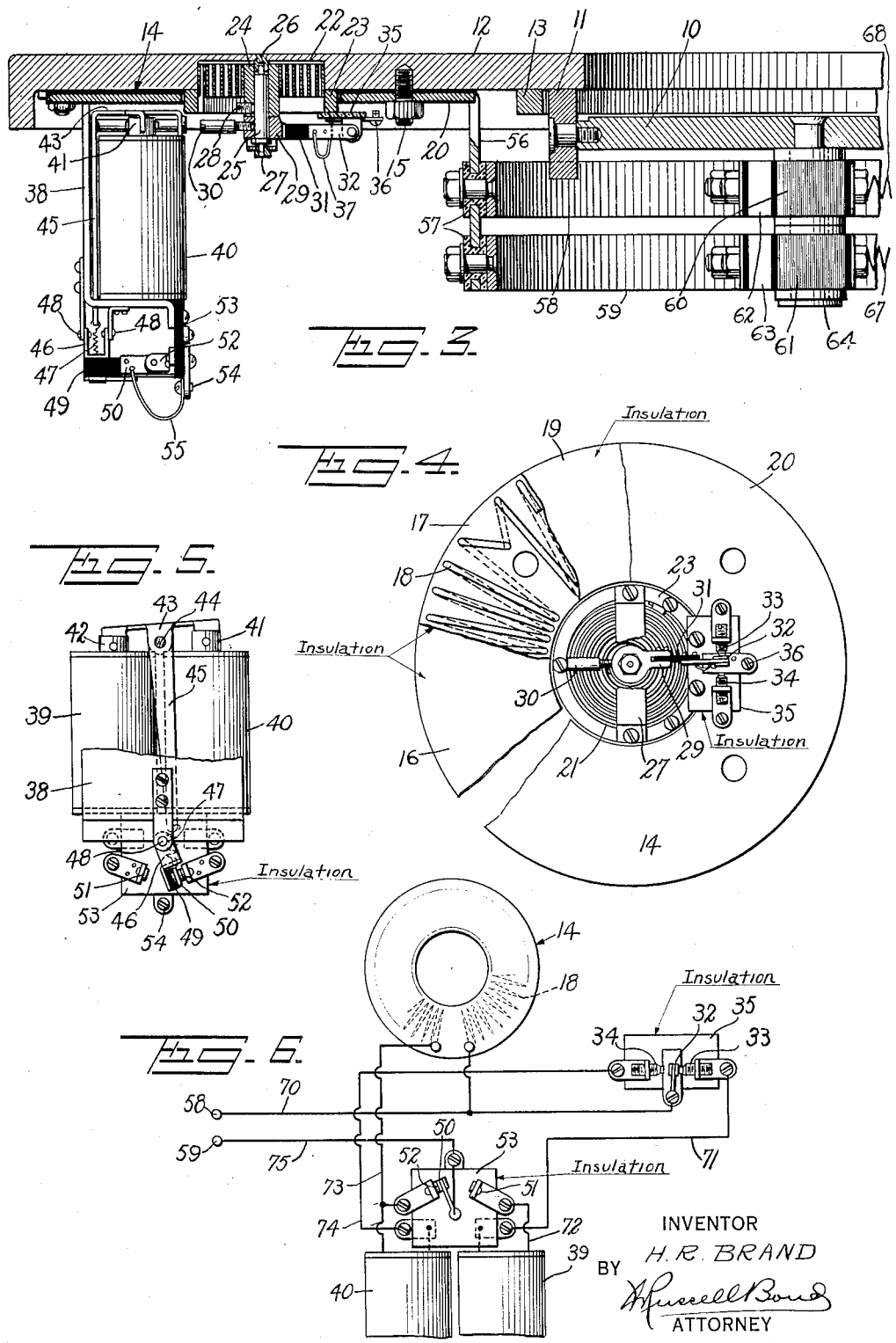

Patented Dec. 18, 1934

1,984,782

UNITED STATES PATENT OFFICE 1,984,782

HEATING APPARATUS FOR GRIDDLES

Harry Russell Brand, New York, N. Y.

Application August 3, 1929, Serial No. 383,239

5 Claims. (Cl. 219—19)

My invention relates to improvements in griddle cake baking machines and has for an object to provide an improved heating system therefor. More particularly my invention relates to machines employing a rotating griddle by which a plurality of cakes are simultaneously baked, the cakes being successively deposited in the raw state at a fixed depositing point and successively removed from the griddle at a fixed delivery point. Obviously there must be a careful regulation of the heating of the griddle with respect to its rate of progression, so that the cakes will be properly baked by the time they reach the delivery point. Such regulation is comparatively simple, as long as there is no interruption in the supply of cakes, but when the cakes are baked on order there may be periods when the griddle is not uniformly loaded, and there may be times when there will be no cakes on the griddle. Consequently the heating of the griddle must be varied in accordance with the amount of batter carried thereby. More heat is required in the parts which are receiving a fresh batch of batter than in the parts which carry partly baked cakes, while vacant spaces on the griddle require very little heat.

It is an object of my invention to provide a griddle with separate heating units placed respectively under the spots on which the batter cakes are to be deposited, and to control each heating unit individually by means of a thermostat. Thus, when a batch of batter is deposited upon the griddle, there will be an increased amount of heat delivered to the griddle under the batter by reason of the thermostatic control at that point and when the cake is removed from the griddle, the heat will be automatically cut down so that there will be no danger of overheating the griddle and yet there will always be sufficient heat to properly bake the cake.

Other objects of my invention will appear in the following description of a preferred embodiment and thereafter the novelty and scope of my invention will be pointed out in the claims.

In the accompanying drawings;

Figure 1 is a bottom plan view of a griddle equipped with individually controlled heating units;

Fig. 2 is a view in section taken on the line 2—2 of Fig. 1, and showing the griddle still in inverted position;

Fig. 3 is a fragmentary view in section and on an enlarged scale taken on the line 3—3 of Fig. 1, the griddle being shown in normal position; i. e., right side up;

Fig. 4 is a bottom plan view of a heating unit and thermostat, the heating unit being partly broken away to reveal interior details;

Fig. 5 is a side elevation of a relay controlled by the thermostat as viewed from the left hand side of Fig. 3, the mounting of the relay being broken away to illustrate an armature lever; and, Fig. 6 is a diagrammatic view of electric connections.

Referring to Fig. 3, I show at 10 a portion of the main frame of a griddle baking machine. The member 10 is in the form of a disc provided at its periphery with rollers 11. Supported on these rollers is an annular griddle 12. The griddle is provided on its under face with an annular guide rail 13 which lies close to the rollers 11 and prevents lateral displacement of the griddle thereon. The mechanism for rotating the griddle 12 is not shown. The griddle may be rotated continuously but is preferably driven with a step-by-step motion, so that it will pause to receive successive portions of batter and to permit certain cake turning and cake removing mechanism to operate while the griddle is stationary. The batter depositing, cake-turning and cake-removing mechanism form no part of the present invention and hence are not shown in the drawings.

The griddle illustrated in the drawings has a capacity for simultaneously baking fifteen cakes and hence is provided with fifteen heating units on its under face. These heating units are indicated generally by the reference numeral 14 and they are secured to the under face of the plate by means of bolts 15. The heating units are here shown as comprising flat coils of electrical resistance wire.

The construction of the heating units is clearly shown in Fig. 4. A thin disc of electrical insulation 16 is provided at the top and bears directly against the griddle. Bearing against the disc 16 is a second disc 17 on which is wound a flat coil 18 of resistance wire, the latter passing through perforations in the plate 17. Another thin disc 19 of electrical insulation bears against the under face of the coil 18, and finally a disc 20 of metal or other suitable material bears against the disc 19 and provides a substantial support for the heating unit. The heating unit is of annular form so as to provide clearance for a thermostat element in the center thereof.

The thermostat element consists of a bi-metallic spiral coil 21 which projects into a recess 22 formed in the under face of the griddle 12. The coil 21 is thus brought very close to the cooking surface of the griddle and will be sensitive to any thermal changes therein. The coil is secured at one end to a ring 23 which is fastened by means of screws to the griddle 12 at the margin of the recess 22. The other end of the coil 21 is secured to a central sleeve 24 mounted on a spindle 25. The spindle is journaled at its inner end in a lug 26 riveted to the griddle while the outer end of the spindle is journaled in a yoke 27 fastened to the ring 23. A set screw 28 serves to fasten the sleeve 24 at any desired adjustment on the spindle 25. An arm 29 is mounted on the spindle 25 near its outer end and is secured at desired adjustment thereon by means of a set screw 30. The arm 29 carries a plate 31 of insulating material and the latter in turn supports a contact plate 32 which is adapted to play between adjustable contact points 33 and 34. The latter are mounted on a plate 35 of insulating material which in turn is secured to the ring 23. The plate 35 also carries a binding screw 36 which is electrically connected by a flexible conductor 37 to the contact plate 32. It will be observed that the set-screw 30 is formed with a weighted head to serve as a counter-balance for the arm 29 and parts carried thereby.

Mounted on brackets 38 adjacent each heating unit are two solenoids 39 and 40. The solenoids are provided with cores 41 and 42, respectively, which are pivotally connected to a cross arm 43. The arm 43 is pivoted at 44 to the bracket 38 and is provided with a depending arm 45 integral therewith. At the lower end of the bracket 38 is mounted an oscillating arm 46. A tension spring 47 is connected at one end to the arm 45 and at the other to the arm 46 below the pivots 48 on which the latter arm oscillates. A plate 49 of insulating material is mounted on the arm 46 and the latter in turn carries a contact plate 50 which is adapted to play between a pair of contact points 51 and 52. These contact points are supported on a plate 53 of insulating material secured to the end of the bracket 38. A binding screw 54 is carried by the plate 53 and is electrically connected by a flexible lead 55 to the contact plate 50.

Supported on brackets 56 depending from the griddle 12 and electrically insulated therefrom by means of thimbles 57, is a pair of collector rings 58 and 59. Current is supplied to the rings from a suitable source of supply by means of brushes 60 and 61. The latter are carried by arms 62 and 63, but are insulated therefrom, as clearly shown in Fig. 1. The arms 62 and 63 are pivotally mounted on a stud 64 depending from the frame member 10 and each arm is provided with a rearward extension, 65 and 66 respectively, connected by tension springs 67 and 68 to a pin 69 depending from the plate 10. By this means the brushes 60 and 61 are held resiliently in engagement with the collector rings 58 and 59, respectively.

The electrical connections are shown diagrammatically in Fig. 6. A wire 70 runs from the collector ring 58 to one terminal of the coil 18 and also by way of the binding post 36 to the contact arm 32. From the contact point 33, a wire 71 runs to one terminal of the solenoid 39, while the other terminal is connected by a wire 72 to the contact screw 51. The other terminal of the coil 18 is connected by a wire 73 to one terminal of the solenoid 40, while the other terminal of said solenoid is connected by a wire 74 to the contact screw 34. The line 73 is also connected to the contact member 52. A line 75 runs from the collector ring 59 by way of binding screw 54 to the contact plate 50 on the oscillating arm 46.

Fig. 6 shows the position of the parts with the current flowing through the heating coil 18. The course of the current may be traced as follows: From the collector ring 58 and line 70, through coil 18, line 73, contact 52, contact plate 50 and line 75, to collector ring 59. As soon as the heating unit has been heated above a certain predetermined temperature, the thermostat coil 21 will swing contact arm 32 away from contact 33 and into engagement with the contact 34 and this will cause a momentary energizing of the coil 40. The current may be traced as follows: From collector ring 58, through line 70, arm 32, contact point 34, line 74, the winding of solenoid 40, contact 52, contact plate 50 and line 75 to collector ring 59. When the solenoid 40 is energized it will attract its core 41 causing the arm 45 to swing toward the left as viewed in Fig. 5, and after it has passed sufficiently beyond the pivots 48, the spring 47 will cause the oscillating arm 46 and with it the contact plate 50 to snap out of engagement with the contact point 52 and into engagement with the contact point 51. When this happens current is cut off from the solenoid 40 and also from the winding 18, but the contact plate 50 is now in position to energize the solenoid 39 as soon as the contact arm 32 swings back into engagement with the contact 33. This will occur as soon as the coil 18 has cooled down sufficiently for the thermostat coil 21 to return the arm 32 to the position shown in Fig. 6. The instant plate 32 engages contact 33, current will flow from the line 70 through contact 33, line 71, the winding of solenoid 39, line 72, contact 51, and contact plate 50 to line 75. As soon as the solenoid 39 is energized it swings the arm 45 in the opposite direction or toward the right as indicated in Fig. 5 and the spring 47 will then pull the plate 50 out of engagement with contact 51 and into engagement with contact 52. This will restore the parts to the position shown in Fig. 6 and current will now flow through the heating coil 18 as explained above, but the solenoid 39 will have been deenergized as soon as the plate 50 separated from the contact point 51. It will be observed that by this arrangement no current flows through the solenoids 39 and 40 except momentarily, in one solenoid at a time, during the switching operation which turns the current on or off the heating coil 18.

While I have described a preferred embodiment of my invention, I wish it to be distinctly understood that I do not limit myself to the particular construction illustrated and described, but consider myself at liberty to make any changes in form, construction, and arrangement of parts which fall within the spirit and scope of the following claims.

I claim:

1. In combination, a rotary griddle providing a continuous annular cooking surface, means for heating localized areas of said surface to cook batter cakes, said griddle being adapted to convey the cakes from a batter depositing point to a delivery point at a predetermined rate, so that the cakes will be properly baked by the time they reach the delivery point, and thermostatic means for maintaining each of said areas at a substantially constant temperature whether there be a cake thereon or not.

2. In combination a griddle plate providing a plurality of cake baking spaces, the plate being formed with a region of reduced thickness in each space, a heating element for each space, and thermostats for controlling said elements respectively, said thermostats being located in said regions of reduced thickness.

3. In combination a rotary griddle plate providing a plurality of cake baking spaces, the plate being formed with a recess under each space, an annular heating element secured to the plate under each space and concentric with the recess thereat, and a thermostat in each recess for controlling the surrounding heating element.

4. In combination, a rotary griddle plate providing a plurality of cake baking spaces on its upper surface, the plate being provided with a recess in its lower surface under each space, an annular heating element secured to the plate under each space and concentric with the recess thereat, and a thermostat in each recess for controlling the surrounding heating element, said thermostat lying closely adjacent the inner end wall of the recess and comprising a thermally expansible element mounted to expand in a plane parallel to the upper surface of the griddle plate.

5. In combination, a rotary griddle plate providing a plurality of cake baking spaces on its upper surface, the plate being provided with a recess in its lower surface under each space, an annular heating element secured to the plate under each space and concentric with the recess thereat, and a thermostat in each recess for controlling the surrounding heating element, said thermostat lying closely adjacent the inner end wall of the recess and comprising a thermally expansible coil lying close to the inner end wall of the recess and adapted to expand in a plane parallel to the baking surface of the griddle.

HARRY RUSSELL BRAND.